Oct. 13, 1964  J. R. HALISKY ETAL  3,152,405
SYSTEM ANALYSIS AND DIAGNOSTIC TRAINER
Filed Dec. 29, 1961
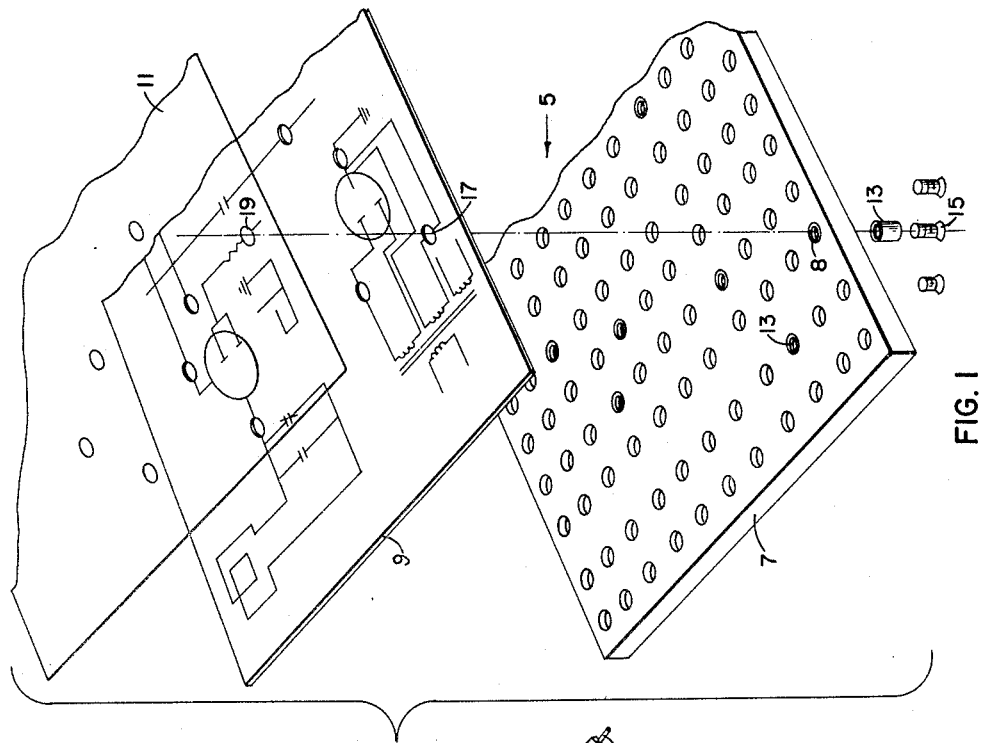
FIG. 1
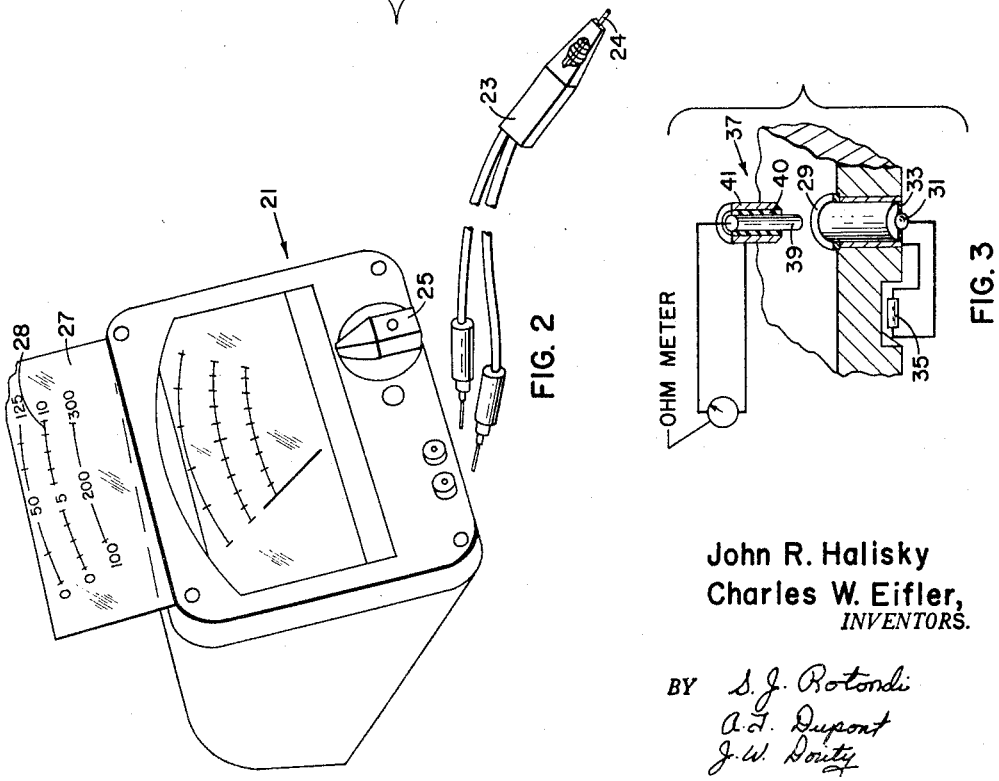
FIG. 2
FIG. 3
John R. Halisky
Charles W. Eifler,
INVENTORS.
BY S. J. Rotondi
A. I. Dupont
J. W. Douty United States Patent Office 3,152,405
Patented Oct. 13, 1964

3,152,405
SYSTEM ANALYSIS AND DIAGNOSTIC TRAINER
John R. Halisky, 415 Hughes Drive, Redstone Arsenal, Ala., and Charles W. Eifler, Quarters 1, Frankford Arsenal, Philadelphia 37, Pa.
Filed Dec. 29, 1961, Ser. No. 163,368
6 Claims. (Cl. 35—19)
(Granted under Title 35, U.S. Code (1952), sec. 266)

The invention described herein may be manufactured and used by or for the Government for governmental purposes without the payment of any royalty thereon.

This invention relates to a system analysis and diagnostic trainer. More particularly to a device for training students to analyze electrical, pneumatic, hydraulic, and other systems being taught by visual indications of selective normal and malfunctional parameters to be ascertained at selected points in the systems.

In the presently employed basic fundamentals training methods, students utilize standard multi-meter type instruments and various electronic or other system components. This method of teaching basic application of theory results in a high rate of damage to expensive instruments due to inexperience in their use and necessitates the handling of a large number of chassis or components for student utilization. Also, many types of instruments must be provided to be used on pneumatic, electrical, hydraulic, and other systems being taught. The expense of these instruments prohibits their purchase by small laboratories.

Damage to both systems and measuring devices can be materially reduced by introduction of a training device employing simulated systems and means for simulatting selected indications of appropriate normal and malfunctional values of parameters corresponding to particular points in the systems.

In view of these facts, an object of this invention is to provide a single, inexpensive device capable of adaptation to any principle which can be graphically represented in schematic form or photograph.

Another object of the invention is to provide a device that will adequately aid students in any type of instruction which involves basic physical fundamentals and is flexible enough to preclude the necessity of any other instruments to teach all systems desired.

A further object of this invention is to provide a device in which the problems and malfunctions presented to the student can be simulated and varied by the instructor with common tools.

The foregoing and other objects of this invention will become more fully apparent from the following detailed description of the invention and from the accompanying drawings, in which:

FIGURE 1 is an exploded perspective view of the test board and schematic diagram.

FIGURE 2 is a pictorial view of a meter and a probe for taking readings from the test board.

FIGURE 3 is a modification, partially in section, of the test board and probe.

The invention is a training device that can be utilized by students in basic hydraulics, pneumatics, electronics, and electrical principles or any system which can be represented by a schematic or diagram. Students can be given any number of problems desired and the trainer possesses sufficient versatility to be changed, as desired, by the instructor with ordinary tools.

In the drawings, wherein for the purpose of illustration, there is shown preferred embodiments of the invention, the numeral 5 designates a trainer comprising: a problem board 7; a problem diagram 9 disposed above said problem board; a protective cover 11 made of clear plastic or acetate for covering said schematic; a probe 23; and a meter 21 for taking readings at selective points on said schematic.

The problem board has a plurality of apertures in which threaded inserts 13 are placed and screws 15 are screwed into the inserts to selected depths to provide calibrated readings in holes corresponding to test points of the problem board selected by the instructor.

The problem diagram and the protective cover have holes, 17 and 19 respectively, punched at preselected test points which are in alignment with certain calibrated apertures of the problem board.

The test probe 23 is one of many devices that could be used to measure the depth of the calibrated apertures and for purpose of explanation a linear potentiometer is used. The probe has a spring loaded, movable contact 24 which is adapted to be inserted in aperture 8 and is limited in travel to the thickness of the board. Probe 23 is connected to a meter 21 provided with a removable scale which can be calibrated to give a reading in pounds per square inch, cubic feet per minute, gallons per minute, volts, etc. The value of this reading depends on the depth that the probe is allowed to extend into the problem board and the particular reading observed on the meter depends on the type front face 27 that has been inserted by the instructor. A dummy meter range selection switch 25 is mounted on the front of the meter so that the student can select the proper scale 28 on the front face.

The operation of the device is as follows:

A student is given a board 7 on which is superimposed the problem diagram which can be a component photo, schematic or graphical respresensation of a system (for purposes of explanation a schematic is used). By locating test points over inserts provided by the instructor and pre-mounted on the board, the student may, by selecting the proper meter range and utilizing an applicable meter face provided by the instructor, test and trouble shoot the schematic. When the student inserts the test probe in the test holes, movable contact 24 engages screw 15 and the probe generates a signal responsive to the depth that the movable contact is allowed to extend into the hole since the sliding contact of the potentiometer moves with the movable contact. This signal creates a reading on the meter which relates to the system represented on the board. With this arrangement the student can continue to trouble shoot the system representation until he finds the malfunction represented by the board he is using. When the student locates the malfunction, the instructor can change the board to provide another problem or give the student another board to check.

The instructor, by changing the length of screws 15 in the inserts 13, can vary the meter indications to an infinite degree and can provide changes in existing boards so as to preclude obsolescense. Instead of using different length screws, any type filler such as plastic or putty could be used to vary the depth of the apertures in the problem board.

A modification of the invention is shown in FIGURE 3, in which different size resistors 35 are associated with the apertures of the test board instead of using selected length screws. One end of resistor 35 is connected to a conductive sleeve 29 while the other end of the resistor is connected to a conductive member 31 which is insulated from the conductive sleeve 29 by an insulator 33. Instead of using a meter and a probe for measuring the depth of the aperture as is shown in FIGURES 1 and 2, an ohm meter is used to measure the resistance between conductive member 31 and conductive sleeve 29. The probe 37 comprises two electrodes 39 and 41 for measuring the resistance between the conductive sleeve and conductive member 31. In order to avoid the possibility of the electrodes short circuiting, a layer of insulation 40 is placed between the electrodes.

The operation of the device shown in FIGURE 3 is similar to that of the device of FIGURES 1 and 2. Instead of placing selected length screws in the apertures, the instructor connects different size resistors between the conductive sleeves and the conductive members. Therefore, when the student takes readings at the respective test points, he is actually measuring the resistance between the conductive sleeve and the conductive center member. These readings show up on the meter face in p.s.i., c.f.m., gal. per min., volts, etc., depending on the type face the instructor has placed in the meter. The probe used with the ohm meter is so adapted that outer electrode 41 makes contact with conductive sleeve 29 and inner electrode 39 makes contact with conductive member 31.

It is to be understood that the forms of the invention herein shown and described are the preferred embodiments and that various changes in the shape, size, and arrangement of parts may be resorted to without departing from the spirit of the invention or the scope of the subjoined claims.

We claim:

1. A diagnostic trainer comprising; a test board having a plurality of apertures therein; a diagnostic problem sheet, depicting a particular system thereon having holes therein at certain predetermined test points; said problem sheet disposed on said test board so that the holes in said problem sheet are aligned with certain preselected apertures of said test board; threaded inserts disposed in the apertures of said test board; and selective length screws screwed into said inserts for providing calibrated depth holes under the test points; and probe means for providing upon insertion into said apertures an indication proportional to the depth of said apertures.

2. A device as set forth in claim 1, in which said probe means for providing an indication responsive to the depth of said apertures comprises: means for generating an electrical signal proportional to the depth of said apertures at the preselected test points when said means is inserted into said apertures, and a meter electrically connected to said signal generating means for providing a reading responsive to the signal produced by said signal generating means.

3. A diagnostic trainer comprising: a test board having a plurality of apertures therein; a diagrammatic problem sheet having holes therein at certain predetermined test points, said problem sheet disposed on said test board so that said holes in said problem diagram are aligned with certain apertures of said test board; threaded inserts disposed within said apertures; selective length screws screwed into the inserts for providing calibrated depth holes under said test points; a test probe including a potentiometer having a movable contact adjustable by said threaded inserts upon insertion of the probe into said apertures to control a signal the amplitude of which is proportional to the depth of said holes under the test points, and a meter electrically connected to said potentiometer for providing a reading responsive to the signal produced by said test probe.

4. A device as in claim 3, in which said problem sheet represents systems with said test points disposed at locations in the systems where actual meter readings would indicate selective normal and malfunctional parameters of the systems; and said problem sheet being disposed to produce readings on said scales corresponding to said parameters.

5. A diagnostic trainer comprising: a test board having a plurality of apertures therein; a diagrammatic problem sheet having holes therein at certain predetermined test points, said problem sheet disposed on said test board so that the holes in said problem sheet are aligned with certain preselected apertures of said test board; each of said apertures having a conductive sleeve adjacent the wall of said aperture; a conductive member centrally located at one end of said sleeve and insulated from said sleeve; and a resistor of a predetermined value connected between said conductive sleeve and said conductive member for the purpose of providing a measurable resistance, whereby, the resistance is proportional to values representative of the system depicted on said problem sheet; and means for providing an indication responsive to the value of the resistance at said preselected test points.

6. A device as set forth in claim 5, in which said means for providing an indication responsive to the value of the resistance at said preselected test points comprises: a test probe and a meter electrically connected to said test probe for providing a reading responsive to the resistance of the resistor connected between the conductive sleeve and the conductive member upon insertion of said probe into one of said apertures.

References Cited in the file of this patent

UNITED STATES PATENTS

| | | |
|---|---|---|
| 2,374,800 | Bohlke | May 1, 1945 |
| 2,506,482 | Batcheller | May 2, 1950 |
| 2,592,552 | De Florez et al. | Apr. 15, 1952 |
| 2,882,618 | Thompson | Apr. 21, 1959 |
| 2,889,634 | Bringmann | June 9, 1959 |